United States Patent
Takeuchi et al.

(10) Patent No.: US 12,545,870 B2
(45) Date of Patent: Feb. 10, 2026

(54) THREE-DIMENSIONAL MUSCLE TISSUE AND PRODUCTION METHOD THEREFOR

(71) Applicants: NISSIN FOODS HOLDINGS CO., LTD., Osaka (JP); The University of Tokyo, Tokyo (JP)

(72) Inventors: Shoji Takeuchi, Tokyo (JP); Yuya Morimoto, Tokyo (JP); Ai Shima, Tokyo (JP); Mai Furuhashi, Osaka (JP)

(73) Assignees: NISSIN FOODS HOLDINGS CO., LTD., Osaka (JP); THE UNIVERSITY OF TOKYO, Tokyo (JP)

( * ) Notice: Subject to any disclaimer, the term of this patent is extended or adjusted under 35 U.S.C. 154(b) by 1061 days.

(21) Appl. No.: 17/436,456

(22) PCT Filed: Jan. 22, 2020

(86) PCT No.: PCT/JP2020/002055
§ 371 (c)(1),
(2) Date: Sep. 3, 2021

(87) PCT Pub. No.: WO2020/179257
PCT Pub. Date: Sep. 10, 2020

(65) Prior Publication Data
US 2022/0169962 A1 Jun. 2, 2022

(30) Foreign Application Priority Data
Mar. 4, 2019 (JP) .................................. 2019-038756

(51) Int. Cl.
*C12M 3/00* (2006.01)
*C12M 1/12* (2006.01)

(52) U.S. Cl.
CPC ............ *C12M 21/08* (2013.01); *C12M 25/14* (2013.01)

(58) Field of Classification Search
CPC ............................... C12M 21/08; C12M 25/14
See application file for complete search history.

(56) References Cited

U.S. PATENT DOCUMENTS

| | | | |
|---|---|---|---|
| 6,207,451 B1 | 3/2001 | Dennis et al. | |
| 7,829,334 B2 | 11/2010 | Kanzaki et al. | |
| 9,018,008 B2 | 4/2015 | Cho et al. | |
| 9,950,094 B2 | 4/2018 | Takahashi et al. | |
| 2009/0291065 A1 | 11/2009 | Laino et al. | |
| 2013/0029008 A1* | 1/2013 | Forgacs | C12N 5/0697 426/55 |
| 2013/0173018 A1 | 7/2013 | Sakaguchi et al. | |
| 2016/0279292 A1 | 9/2016 | Takahashi et al. | |
| 2017/0211044 A1 | 7/2017 | Huebsch et al. | |
| 2017/0321176 A1 | 11/2017 | Kim et al. | |
| 2018/0263995 A1 | 9/2018 | Schmidt et al. | |
| 2018/0355308 A1 | 12/2018 | Matsusaki et al. | |

FOREIGN PATENT DOCUMENTS

| | | | |
|---|---|---|---|
| CN | 101132803 | 2/2008 | |
| CN | 103747693 | 4/2014 | |
| CN | 104152406 | 11/2014 | |
| JP | 2008-72967 | 4/2008 | |
| JP | 4553038 | 9/2010 | |
| JP | 2015-037381 | 2/2015 | |
| JP | 2018-194 | 1/2018 | |
| JP | 6427836 | 11/2018 | |
| WO | 2012/036225 | 3/2012 | |
| WO | 2013/016547 | 1/2013 | |
| WO | 2014/148321 | 9/2014 | |
| WO | 2018/170180 | 9/2018 | |
| WO | WO-2019016795 A1 * | 1/2019 | ............. A23L 13/00 |

OTHER PUBLICATIONS

Bian, W., and Bursac, N., "Engineered skeletal muscle tissue networks with controllable architecture," Biomaterials 30(7):1401-1412. doi: 10.1016/j.biomaterials.2008.11.015. Epub Dec. 12, 2008. (Year: 2008).*
Ikeda, K., et al., "Effects of heat stimulation and l-ascorbic acid 2-phosphate supplementation on myogenic differentiation of artificial skeletal muscle tissue constructs," J Tissue Eng Regen Med 11(5):1322-1331. doi: 10.1002/term.2030. Epub Jun. 1, 2015. (Year: 2015).*
Preliminary Office Action issued Sep. 4, 2024 in corresponding Brazil Patent Application No. BR112021015968-1 with English translation.
Extended European Search Report issued Nov. 18, 2022 in European Patent Application No. 20765947.5.
Office Action issued Apr. 25, 2024 in corresponding Chinese Patent Application No. 202080018038.5, with English machine translation.
International Search Report issued Mar. 24, 2020 in International (PCT) Application No. PCT/JP2020/002055.
Suzuki et al., "A study for myoblasts' orientation using collagen sheets", The proceedings of JSME Annual Conference on Robotics and Mechatronics (Robomec), The Japan Society of Mechanical Engineers, 06, 2016, pp. 2A2-12b3(1) to 2A2-12b3(2), with English language abstract.

(Continued)

*Primary Examiner* — Tracy Vivlemore
*Assistant Examiner* — Eric J Rogers
(74) *Attorney, Agent, or Firm* — Wenderoth, Lind & Ponack, L.L.P.

(57) ABSTRACT

The present invention provides a production method for a three-dimensional muscle tissue including the steps of: preparing an approximately rectangular first cell module containing skeletal myoblasts in a hydrogel, and having a plurality of approximately rectangular holes parallel to each other, and an approximately rectangular second cell module containing skeletal myoblasts in a hydrogel, and having a plurality of approximately rectangular holes parallel to each other at positions different from those of the first cell module in a vertical direction; alternately stacking the prepared first cell module and the prepared second cell module to obtain a stack; subjecting the skeletal myoblasts contained in the obtained stack to proliferation culture; and inducing the proliferated skeletal myoblasts to differentiate into myotubes.

10 Claims, 5 Drawing Sheets

(56) References Cited

OTHER PUBLICATIONS

Furuhashi et al., "Construction of Cultured Meat by Layering of Myoblast Modules", Annual Meeting of the Japan Society for Bioscience, Biotechnology, and Agrochemistry, 2019, URL:https://www.jsbba.or.jp/MeetingofJSBBA/2019/MeetingofJSBBA2019.pdf, with partial English translation.

* cited by examiner

THREE-DIMENSIONAL MUSCLE TISSUE AND PRODUCTION METHOD THEREFOR

TECHNICAL FIELD

The present invention primarily relates to a production method for a three-dimensional muscle tissue.

BACKGROUND ART

Along with an increase in population and income growth in emerging countries, there is an increasing demand for meat. Meanwhile, it is difficult to increase an amount of meat supply owing to problems concerning soaring prices of grain for livestock feed and securement of breeding places, and hence development of meat analogues is hoped for.

Cultured meat (three-dimensional muscle tissue) is produced by forming a tissue through use of skeletal muscle cells proliferated by culture. Cultured meat can be produced in a laboratory, and hence can be produced independently of climate change. In addition, cultured meat has a reduced environmental load because of a low greenhouse gas emission level as compared to conventional animal husbandry.

CITATION LIST

Patent Literature

PTL 1: JP 2018-000194 A
PTL 2: JP 6427836 B2

SUMMARY OF INVENTION

Technical Problem

In order to produce a meat having a texture like that of steak meat from cells, a mature three-dimensional muscle tissue needs to be constructed. In the field of regenerative medicine, there are reports of the construction of three-dimensional muscle tissues using human and mouse skeletal muscle cells (Patent Literatures 1 and 2). However, conditions specialized for edible cultured meat have yet to be sufficiently investigated.

An object of the present invention is to provide a production method for a three-dimensional muscle tissue particularly suited for edible use.

Solution to Problem

The inventors of the present invention have made extensive investigations in view of the above-mentioned object, and as a result, have found that the object can be achieved by a production method including the steps of: preparing an approximately rectangular first cell module containing skeletal myoblasts in a hydrogel, and having a plurality of approximately rectangular holes parallel to each other, and an approximately rectangular second cell module containing skeletal myoblasts in a hydrogel, and having a plurality of approximately rectangular holes parallel to each other at positions different from those of the first cell module in a vertical direction; alternately stacking the prepared first cell module and the prepared second cell module to obtain a stack; subjecting the skeletal myoblasts contained in the obtained stack to proliferation culture; and inducing the proliferated skeletal myoblasts to differentiate into myotubes. The present invention has been completed by making further investigations on the basis of such finding.

The present invention encompasses the following aspects.

Item 1. A production method for a three-dimensional muscle tissue including the steps of: preparing an approximately rectangular first cell module containing skeletal myoblasts in a hydrogel, and having a plurality of approximately rectangular holes parallel to each other, and an approximately rectangular second cell module containing skeletal myoblasts in a hydrogel, and having a plurality of approximately rectangular holes parallel to each other, at least part of the holes of the second cell module being at positions different from those of the holes of the first cell module in a vertical direction; alternately stacking the prepared first cell module and the prepared second cell module to obtain a stack; and inducing the skeletal myoblasts to differentiate into myotubes.

Item 2. The production method according to Item 1, wherein the hydrogels each contain collagen at 0.3 mg/mL or more.

Item 3. The production method according to Item 1 or 2, wherein the hydrogels each contain ascorbic acid or a salt thereof or a derivative thereof at from 10 μM to 1,000 μM.

Item 4. The production method according to any one of Items 1 to 3, wherein the holes of the first cell module and the second cell module each have a width of from 200 μm to 2,000 μm in a short-side direction.

Item 5. The production method according to any one of Items 1 to 4, wherein a distance between adjacent holes of each of the first cell module and the second cell module is from 200 μm to 2,000 μm in a short-side direction.

Item 6. The production method according to any one of Items 1 to 5, wherein the first cell module and the second cell module each have a size measuring 3 mm or more in a short-side direction and 9 mm or more in a long-side direction.

Item 7. The production method according to any one of Items 1 to 6, wherein a total number of the first cell modules and the second cell modules to be stacked is 6 or more.

Item 8. The production method according to any one of Items 1 to 7, wherein, in the stack, both ends of each of the first cell module and the second cell module in a long-side direction are immobilized.

Item 9. The production method according to any one of Items 1 to 8, wherein the production method is a production method for an edible three-dimensional muscle tissue.

Item 10. The production method according to any one of Items 1 to 9, wherein the skeletal myoblasts are bovine skeletal myoblasts.

Item 11. A three-dimensional muscle tissue, which is obtained by the production method of any one of Items 1 to 10.

Advantageous Effects of Invention

According to the present invention, the production method for a three-dimensional muscle tissue particularly suited for edible use is provided. The three-dimensional muscle tissue produced by the production method of the present invention has a sarcomere structure like a living muscle. In addition, a three-dimensional muscle tissue having a sufficient size suited for edible use can be produced. Accordingly, the three-dimensional muscle tissue produced by the production method of the present invention can be expected to have a texture close to that of livestock meat when put into edible use.

DESCRIPTION OF EMBODIMENTS

Figure 1:
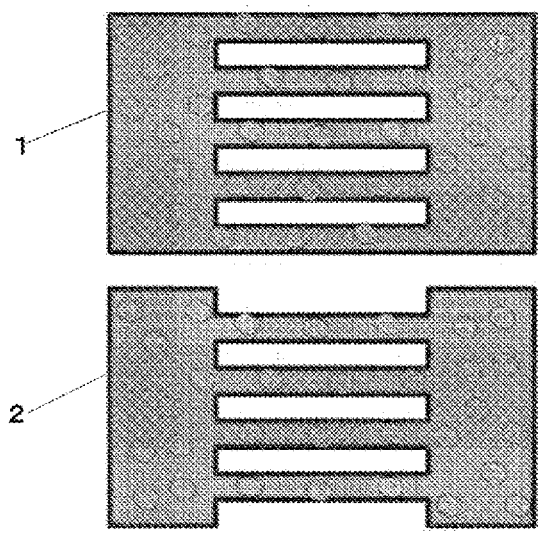
FIG. 1 is an illustration of examples of the shapes of a first cell module (1) and a second cell module (2).

A production method for a three-dimensional muscle tissue of the present invention includes the steps of: preparing an approximately rectangular first cell module containing skeletal myoblasts in a hydrogel, and having a plurality of approximately rectangular holes parallel to each other, and an approximately rectangular second cell module containing skeletal myoblasts in a hydrogel, and having a plurality of approximately rectangular holes parallel to each other, at least part of the holes of the second cell module being at positions different from those of the holes of the first cell module in a vertical direction; alternately stacking the prepared first cell module and the prepared second cell module to obtain a stack; and inducing the skeletal myoblasts to differentiate into myotubes.

In the present invention, the "three-dimensional muscle tissue" mainly means an artificially produced muscle, not derived from living tissue. The three-dimensional muscle tissue of the present invention is formed of skeletal muscle cells (striated muscle cells). The skeletal muscle cells have the form of myotubes (myotube cells) or muscle fibers obtained through multinucleation of the myoblasts serving as precursors thereof.

In general, the muscle fibers each contain as a constituent unit a myofibril formed of filaments of actin serving as a muscle-forming protein (actin filaments) and filaments of myosin serving as a muscle-forming protein (myosin filaments). Further, the myofibril has a structure in which a plurality of sarcomere structures are joined together in a long-axial direction. It is known that contraction and relaxation of muscle occur on the basis of an interaction (sliding) between actin and myosin in sarcomeres.

The three-dimensional muscle tissue of the present invention has a sarcomere structure. However, no limitation is imposed as to whether or not sliding occurs in the sarcomere structure.

Whether or not the three-dimensional muscle tissue has the sarcomere structure may be evaluated by a known technique. For example, the presence of sarcomeric a-actinin (SAA), which is a protein forming a Z-membrane of the sarcomere structure, is evaluated by immunostaining of SAA, and a case of being positive for SAA immunostaining and having a regular stripe-like distribution of SAA may be judged to have the sarcomere structure.

In addition, in the three-dimensional muscle tissue of the present invention, the muscle fibers are aligned and oriented in the same direction. The orientation of the muscle fibers may be evaluated, for example, by immunostaining of SAA.

The three-dimensional muscle tissue of the present invention is preferably an edible three-dimensional muscle tissue. The edible three-dimensional muscle tissue may be paraphrased as, for example, "cultured meat" or "artificial meat". When the three-dimensional muscle tissue of the present invention is an edible three-dimensional muscle tissue, components (preferably all components) to be used in the production method of the present invention are preferably components whose safety has been secured for use in food production and/or food by satisfying predetermined standards, but are not limited thereto.

The first step in the production method of the present invention is a step of preparing a first cell module and a second cell module. The first cell module and the second cell module are hereinafter sometimes collectively referred to as "cell modules".

The cell modules of the present invention each contain skeletal myoblasts in a hydrogel. The skeletal myoblasts may be prepared by a known technique. For example, primary myoblasts obtained by treating a living muscle tissue with a degrading enzyme (e.g., a collagenase) may be used. The primary myoblasts are preferably subjected to filter treatment in order to remove impurities, such as a connective tissue.

In addition, as the skeletal myoblasts, there may be used cells obtained by differentiation induction from stem cells having pluripotency, such as ES cells or iPS cells, or from somatic stem cells having an ability to differentiate into skeletal myoblasts.

The skeletal myoblasts are derived from a vertebrate, such as a mammal, a bird, a reptile, an amphibian, or a fish. Examples of the mammal include non-human mammals, such as a monkey, a bovine, a horse, a pig, a sheep, a goat, a dog, a cat, a guinea pig, a rat, and a mouse. Examples of the bird include an ostrich, a chicken, a duck, and a sparrow. Examples of the reptile include a snake, a crocodile, a lizard, and a turtle. Examples of the amphibian include a frog, a newt, and a salamander. Examples of the fish include a salmon, a tuna, a shark, a sea bream, and a carp. When the three-dimensional muscle tissue is intended to be edible, the skeletal myoblasts are preferably derived from a mammal to be bred for animal husbandry, such as a bovine, a pig, a sheep, a goat, or a horse, and are more preferably derived from a bovine.

As the skeletal myoblasts, there may be used skeletal myoblasts genetically modified by, for example, a genome editing technique, such as a homologous recombination method or a CRISPR/Cas9 method, or non-genetically modified skeletal myoblasts. In one mode of the case in which the three-dimensional muscle tissue is intended to be edible, non-genetically modified skeletal myoblasts are preferably used as the skeletal myoblasts from the viewpoints of safety and consumer preference.

A gel of any of the following materials may be used as the hydrogel for forming each of the cell modules of the present invention: fibrin, fibronectin, laminin, collagen (e.g., type I, type II, type III, type V, or type XI), agar, agarose, a glycosaminoglycan, hyaluronic acid, a proteoglycan, and other constituent components of an extracellular basement membrane matrix. A commercially available product may be used as the hydrogel, and for example, components based on a mouse EHS tumor extract sold under the product name "Matrigel" (containing type IV collagen, laminin, a heparan sulfate proteoglycan, and the like) may be used.

As used herein, the term "collagen" encompasses undenatured collagen and denatured collagen. An example of the denatured collagen is gelatin.

Particularly when the skeletal myoblasts are derived from a bovine, it is preferred that the hydrogel contain collagen, preferably undenatured type I collagen. When the hydrogel contains type I collagen, its content is preferably 0.3 mg/mL or more, more preferably from 1.0 mg/mL to 3.0 mg/mL, still more preferably from 1.0 mg/mL to 1.5 mg/mL.

It is preferred that the skeletal myoblasts in the hydrogel have, for example, a cell density of about $1.0 \times 10^6$ cells/ml or more, preferably from about $1.0 \times 10^7$ cells/ml to about $1.0 \times 10^8$ cells/ml, more preferably from $5.0 \times 10^7$ cells/ml to about $1.0 \times 10^8$ cells/ml.

The cell modules of the present invention may each contain a component (additive) other than the skeletal myoblasts and the hydrogel. Examples of such additive may include medium components (e.g., various amino acids, inorganic salts, and vitamins), serum components (e.g., growth factors, such as IGF-1, bFGF, insulin, and testosterone), and antibiotics.

A preferred example of such additive may be ascorbic acid (vitamin C) or a salt thereof or a derivative thereof. Specific examples of ascorbic acid or the salt thereof include ascorbic acid, sodium ascorbate, potassium ascorbate, and calcium ascorbate. Examples of the ascorbic acid derivative include erythorbic acid, ascorbate phosphate ester and salts thereof, ascorbate sulfate ester and salts thereof, palmitate ascorbyl phosphate ester and salts thereof, and L-ascorbic acid glycosides, such as L-ascorbic acid-2-glucoside. Examples of the salt include a sodium salt, a potassium salt, a calcium salt, and a magnesium salt. The content of ascorbic acid (vitamin C) or the salt thereof or the derivative thereof may be set to from 10 to 1,000 µM, more preferably from 50 to 250 µM, particularly preferably from 50 to 100 µM. When ascorbic acid (vitamin C) or the salt thereof or the derivative thereof is contained at the above-mentioned content, particularly in the case where the skeletal myoblasts are bovine, the induction of differentiation from the skeletal myoblasts into myotubes can be efficiently performed.

The first cell module has an approximately rectangular shape, and has a plurality of approximately rectangular holes parallel to each other. Like the first cell module, the second cell module has an approximately rectangular shape, and has a plurality of approximately rectangular holes parallel to each other. At least part, preferably all, of the plurality of holes of the second cell module are at positions different from those of the first cell module in a vertical direction. An approximately rectangular narrow strip-shaped portion is formed between the holes parallel to each other. FIG. 1 is an illustration of examples of the shapes of the first cell module (1) and the second cell module (2).

The cell modules each have an approximately rectangular shape. The dimension of each of the modules in a short-side direction is preferably 3 mm or more, more preferably 5 mm or more, still more preferably 10 mm or more. The dimension of each of the modules in a long-side direction is preferably 9 mm or more, more preferably 13 mm or more, still more preferably 16 mm or more.

The cell modules each have an approximately rectangular sheet shape. The thickness of each of the cell modules may be set to preferably from about 300 µm to about 2,000 µm, more preferably from about 500 µm to about 1,000 µm.

The number of the plurality of holes of each of the cell modules is preferably from about 1 to about 30, more preferably from about 2 to about 25, still more preferably from about 4 to about 10.

The holes of the cell modules each have an approximately rectangular shape. The dimension of each of the holes in a short-side direction is preferably from 200 µm to 2,000 µm wide, more preferably from 200 µm to 1,000 µm wide, still more preferably from 300 µm to 700 µm wide. In addition, the dimension of the approximately rectangular narrow strip-shaped portion formed between adjacent holes in a short-side direction is preferably from 200 µm to 2,000 µm wide, more preferably from 200 µm to 1,000 µm wide, still more preferably from 500 µm to 1,000 µm wide. The plurality of holes of each of the cell modules are parallel to each other, and are preferably parallel to each other and at approximately equal distances. The holes of each of the cell modules are preferably holes penetrating through the cell module.

Figure 2:
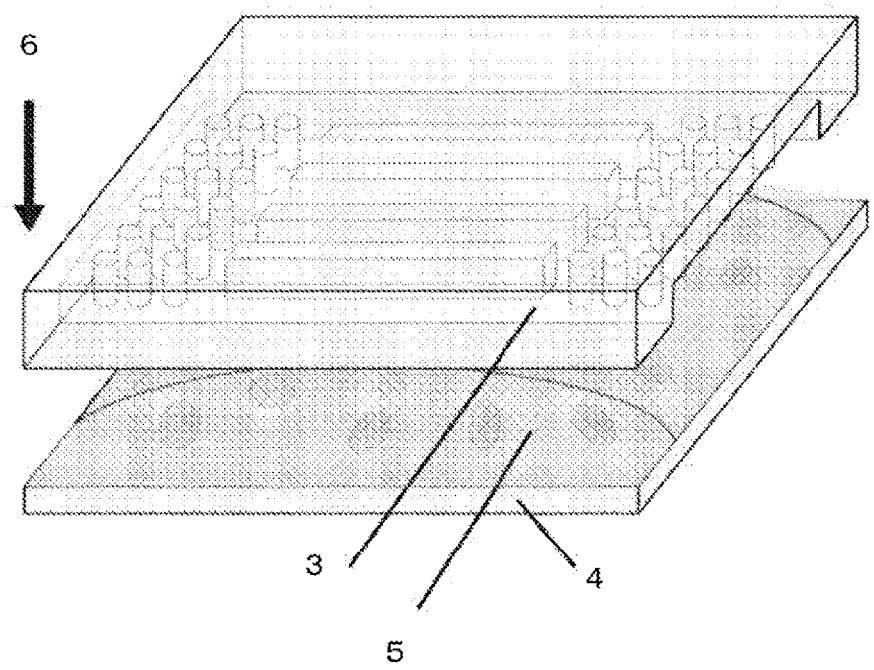
FIG. 2 is an illustration of an example of a method of preparing a cell module.

A method of preparing the cell modules having the above-mentioned shapes is not particularly limited. For example, a cell module having a desired shape may be prepared by sandwiching a hydrogel solution containing the skeletal myoblasts between a mold stamp patterned with the shape of the module and a substrate. Materials for the mold stamp and the substrate are not particularly limited, and for example, thermosetting resins, such as a silicone rubber (dimethylpolysiloxane, PDMS), thermoplastic resins, such as various plastics, and glass may be used. An example of the method of preparing the cell modules is illustrated in FIG. 2.

The second step in the production method of the present invention is a step of alternately stacking the first cell module and the second cell module obtained in the first step to obtain a stack.

As used herein, the term "alternately" means that the order of stacking is as follows: first cell module, second cell module, first cell module, second cell module When the cell modules are alternately stacked, the cell modules immediately above and immediately below any first cell module in the stack are second cell modules unless there is no cell module immediately above or immediately below the first cell module in question.

Figure 3:
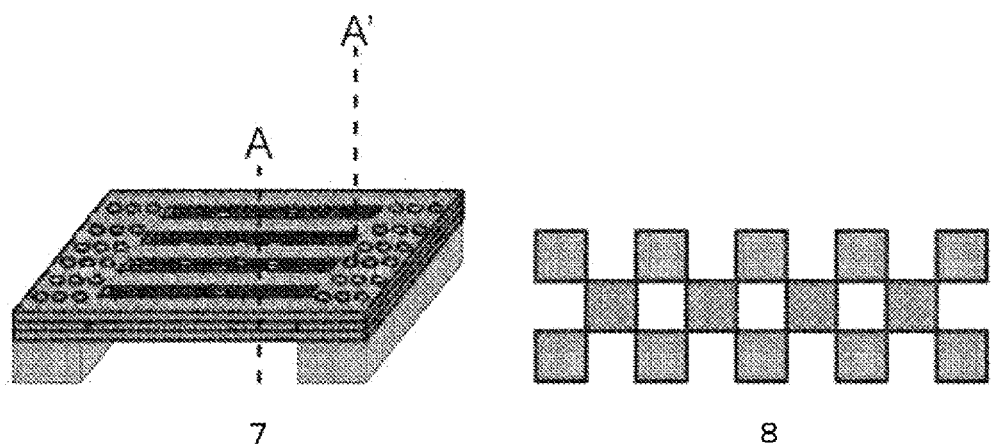
FIG. 3 is an illustration of an example of a method of stacking cell modules.

In a preferred mode of the stacking of the first cell module and the second cell module, the stacking is performed in such a manner that the holes of the first cell module do not overlap at least part (which may be any) of the holes of the second cell module immediately above and immediately below. In other words, in a preferred mode of the stacking, the stacking is performed in such a manner that the narrow strip-shaped portions of the first cell module do not overlap at least part (which may be any) of the narrow strip-shaped portions of the second cell module immediately above and immediately below. When the stacking is performed in such manner, a bundle of myotubes/muscle fibers having an orientation and having a large cross-sectional area can be fabricated. An example of the method of stacking the cell modules is schematically illustrated in FIG. 3.

The number of the first cell modules and the second cell modules to be stacked is not particularly limited. From the viewpoint of producing a three-dimensional muscle tissue having a sufficient thickness, the total number of the first cell modules and the second cell modules to be stacked is preferably 6 or more, and the total number thereof to be stacked is more preferably 10 or more. From the viewpoint of the convenience of the operation, the upper limit of the total number of the first cell modules and the second cell modules to be stacked may be set to preferably 50, more preferably 30, particularly preferably 20, but is not limited thereto.

The stacking may be performed, for example, on an appropriate substrate. That is, a cell module serving as the first layer (one of the first cell module and the second cell module) is placed on the substrate, and another cell module (cell module different from the module serving as the first layer) is stacked thereon. A material for the substrate is preferably a material that is non-adherent to cells, such as dimethylpolysiloxane (PDMS), or a material subjected to surface treatment so as to be non-adherent.

The stacking of the present invention is preferably performed in a mode in which both ends of each of the cell modules in the long-side direction are immobilized. A technique for performing the immobilization may be appropriately selected by a person skilled in the art. For example, both end portions of each of the cell modules may be immobilized using an adhesive component (e.g., a hydrogel of fibrin or the like). In another mode, the cell modules may be immobilized by causing immobilizing members (stakes or anchors) placed on the substrate to penetrate through holes formed in advance in the vicinities of the end portions of the cell modules.

In the production method of the present invention, each cell module after its preparation and before stacking, or the stack obtained by the stacking may be subjected to proliferation culture to proliferate the skeletal myoblasts contained therein.

For example, when the skeletal myoblasts are contained in each of the cell modules in a sufficient amount (e.g., $1.0 \times 10^8$ cells/ml or more), the subsequent differentiation induction step may be performed without the proliferation culture being performed. For example, when the skeletal myoblasts need to be proliferated, the subsequent differentiation induction step may be performed after the proliferation culture has been performed.

The proliferation culture of each cell module after its preparation and before stacking is also preferred from the viewpoint that the stability of the cell module can be further improved. The proliferation culture of the stack obtained by the stacking is also preferred from the viewpoint that cell-cell adhesion between the cell modules can be further promoted.

The above-mentioned culture may be performed, for example, in a medium for the proliferation culture by a technique known to a person skilled in the art. A technique for performing suitable culture is exemplified by a technique involving performing culture under the conditions of about 37° C. and a carbon dioxide concentration of from about 5% (v/v) to about 10% (v/v), but is not limited thereto. The culture under the above-mentioned conditions may be performed, for example, using a known $CO_2$ incubator.

As the medium for the proliferation culture, there may be used a medium obtained by supplementing a general liquid medium, such as Dulbecco's Modified Eagle's Medium (DMEM), Eagle's minimal essential medium (EMEM), or alpha Modified Minimum Essential Medium (MEM), with components such as a serum component (e.g., horse serum, fetal bovine serum (FBS), or human serum) and a growth factor; and an antibiotic, such as penicillin or streptomycin.

When the medium for the proliferation culture is supplemented with the serum component, fetal bovine serum may be used as the serum component. The concentration of the serum component may be set to about 10% (v/v).

A culture period may be set to, for example, from about 1 day to about 2 weeks.

As required, medium exchange may be performed. Culture conditions may be in conformity with a conventional method.

The third step in the production method of the present invention is a step of inducing the skeletal myoblasts to differentiate into myotubes. In this step, the skeletal myoblasts are multinucleated through cell fusion with surrounding cells to form myotubes. The myotubes form muscle fibers through further maturation.

The above-mentioned culture may be performed, for example, in a medium for differentiation induction (for multinucleation) by a technique known to a person skilled in the art. A technique for performing suitable culture is exemplified by a technique involving performing culture under the conditions of about 37° C. and a carbon dioxide concentration of from about 5% (v/v) to about 10% (v/v), but is not limited thereto. The culture under the above-mentioned conditions may be performed, for example, using a known $CO_2$ incubator.

It is known that myoblasts start multinucleation involving surrounding cells when depleted of nutrients. Accordingly, the induction of differentiation into myotubes is preferably performed using a medium less nutritional than that of the above-mentioned proliferation culture. Horse serum is known to be less nutritional than fetal bovine serum, and hence horse serum may be used. The concentration of the serum component may be set to about 2% (v/v).

Thus, the three-dimensional muscle tissue is produced.

EXAMPLES

Next, the present invention is more specifically described by way of Examples. However, Examples to be described below do not limit the scope of the present invention.

1. Induction of Differentiation of Bovine Myoblasts with Vitamin C

The influence of vitamin C in differentiation culture of bovine myoblasts was investigated. A vitamin C derivative was added at the time of differentiation culture at varying concentrations of from 0 to 1,000 μM, and myotube formation rates were measured.

[Methods]

Myoblasts were collected from bovine masseter muscle, and were seeded in a 12-well collagen-coat dish at $1.0 \times 10^5$ cells/well.

After 3 days of culture in a growth medium (10% FBS F12/DMEM, hereinafter referred to as GM), the medium was exchanged with a differential medium (2% HS F12/DMEM, hereinafter referred to as DM) supplemented with a vitamin C derivative (ascorbate phosphate), followed by further culture for 10 days. The concentration of ascorbate phosphate added was 0 mM, 10 mM, 100 mM, or 1 mM, and the medium was exchanged every other day.

After the 10 days of culture in the DM, fixation was performed with 4% PFA, followed by staining of sarcomeric α-actinin (SAA) and cell nuclei by immunostaining and Hoechst staining, respectively. SAA is a protein forming a Z-membrane of a sarcomere structure serving as the smallest unit of a muscle, and is expressed along with myotube formation. In view of this, cells stained by SAA staining were judged to be myotubes, and a fusion index (number of nuclei in the myotubes/total number of nuclei) was calculated from staining results. The fusion index was calculated from 10 staining images each having a total number of nuclei of 100 or more for each concentration of ascorbate phosphate (VC), and the average thereof was determined.

Figure 4:
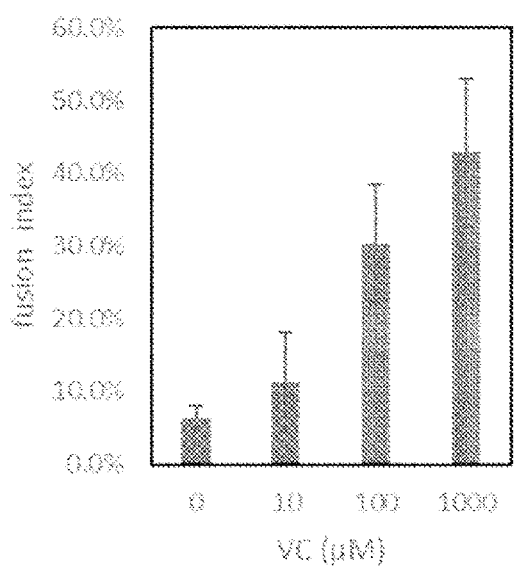
FIG. 4 shows calculation results of a fusion index. VC on the horizontal axis represents ascorbate phosphate.

The results are shown in FIG. 4.

[Discussion]

In both the cases of adding and not adding ascorbate phosphate, myotube formation was observed on the 4th day after the transition to the DM. The number of myotubes formed increased in an ascorbate phosphate concentration-dependent manner, and the lengths and thicknesses of the myotubes formed also increased, suggesting that ascorbate phosphate is involved in the maturation of myotubes.

2. Formation of Three-Dimensional Muscle Tissue Using Bovine Myoblasts

Bovine myoblasts were embedded in a hydrogel, and were cultured with both ends thereof being immobilized, to thereby fabricate a muscle tissue having a length of 7 mm. Formation conditions and maturation conditions for the muscle tissue were investigated by varying hydrogel composition and cell density.

[Methods]

Anchors 9 were immobilized onto PDMS, and a cell-containing hydrogel was seeded so as to connect between the anchors, to thereby form a long and thin muscle tissue.

PDMS was poured into molds fabricated using a stereolithography apparatus, and was solidified to produce an anchor-immobilizing member 10 and a width-adjusting stamp 11. The tissue is immobilized by the anchor-immobilizing member 10 so as to have a length of 7 mm, and by the width-adjusting stamp 11 so as to have a width of 1 mm at the start of culture. In addition, the anchors 9 were fabricated using the stereolithography apparatus. The anchors 9 each included 18 cylindrical immobilization portions each having a diameter of 100 µm and a height of 1.0 mm, and the immobilization portions were coated with fibronectin to promote cell adhesion to immobilize both ends of the tissue.

(1) Investigation of Hydrogel Composition

Collagen type 1 and Matrigel were mixed at each of ratios of 1:0, 1:1, and 0:1 to prepare different hydrogels.

Myoblasts were mixed at $2.0 \times 10^6$ cells with 40 µL of each of three kinds of hydrogels ($5.0 \times 10^7$ cells/mL), and the width of the hydrogel was adjusted to 1 mm with the width-adjusting stamp 11. In order to solidify the hydrogel, incubation was performed in a $CO_2$ incubator at 37° C. for 10 minutes. After that, 10% FBS F12/DMEM was added, followed by culture at 37° C. and 5% $CO_2$. The day after tissue formation, the medium was exchanged with 2% HS F12/DMEM, and culture was further continued for 12 days. The medium was exchanged every other day. After the lapse of 12 days, immunostaining was performed in order to determine the degree of maturation and orientation.

(2) Investigation of Cell Concentration

Myoblasts were embedded in collagen type 1, and cultured. In this case, an investigation was performed with three kinds of numbers of cells embedded, i.e., $1.0 \times 10^6$ cells, $2.0 \times 10^6$ cells, and $4.0 \times 10^6$ cells ($2.5 \times 10^7$ cells/mL, $5.0 \times 10^7$ cells/mL, and $10.0 \times 10^7$ cells/mL, respectively). A culture method was the same as in (1), and from the 2nd day of culture onward, the culture was performed in 2% HS F12/DMEM supplemented with 100 µM ascorbate phosphate.

Figure 5:
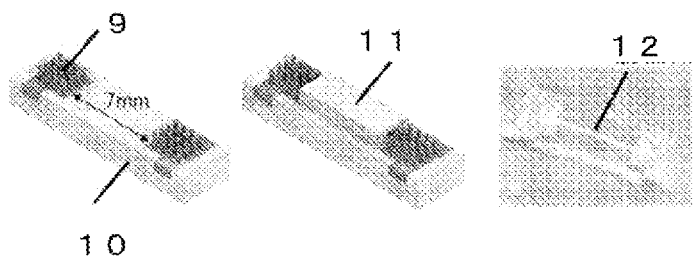
FIG. 5 is an illustration of a technique for forming a three-dimensional muscle tissue.
Figure 6:
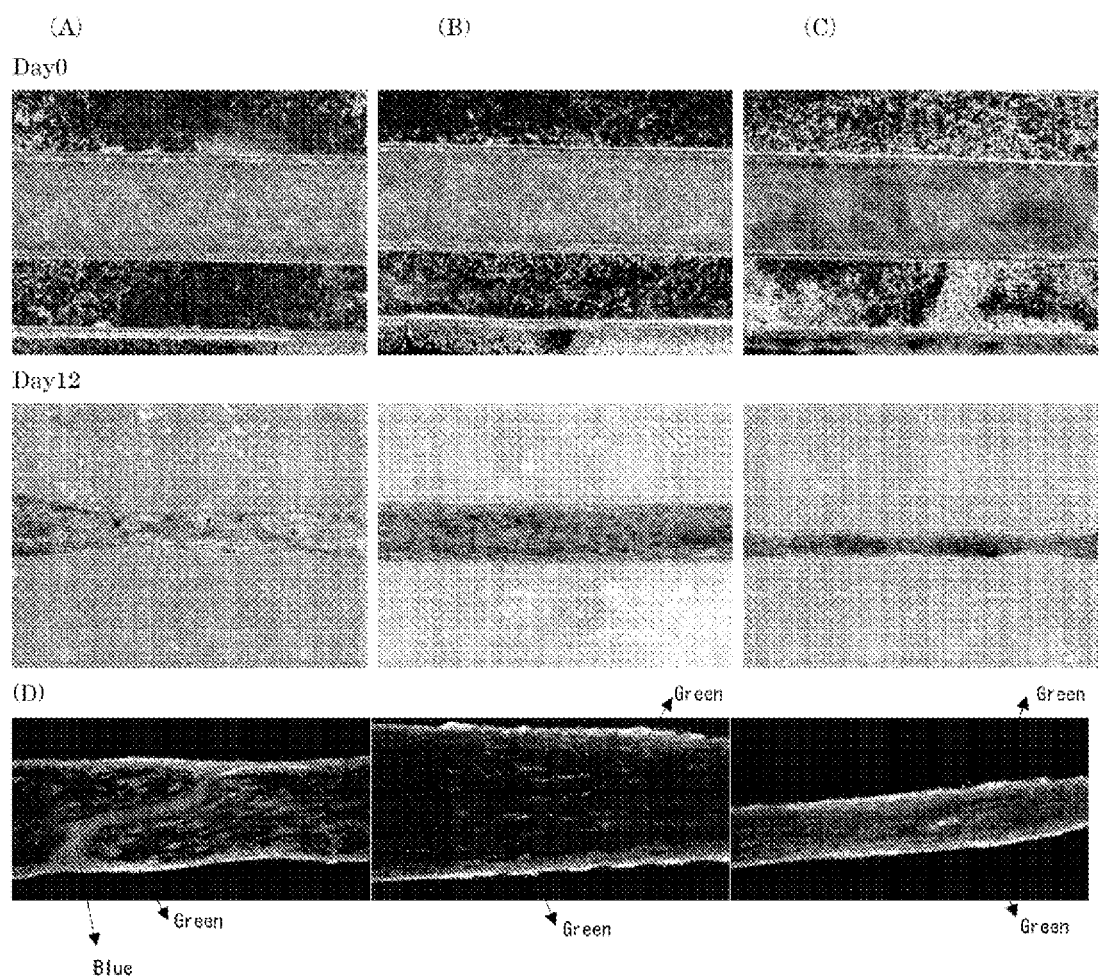
FIG. 6 show the results of an investigation of hydrogel composition. (A) Matrigel 100%, (B) Matrigel:collagen=1:1, (C) collagen 100%, (D) immunostaining (blue: cell nuclei, green: SAA)
Figure 7:
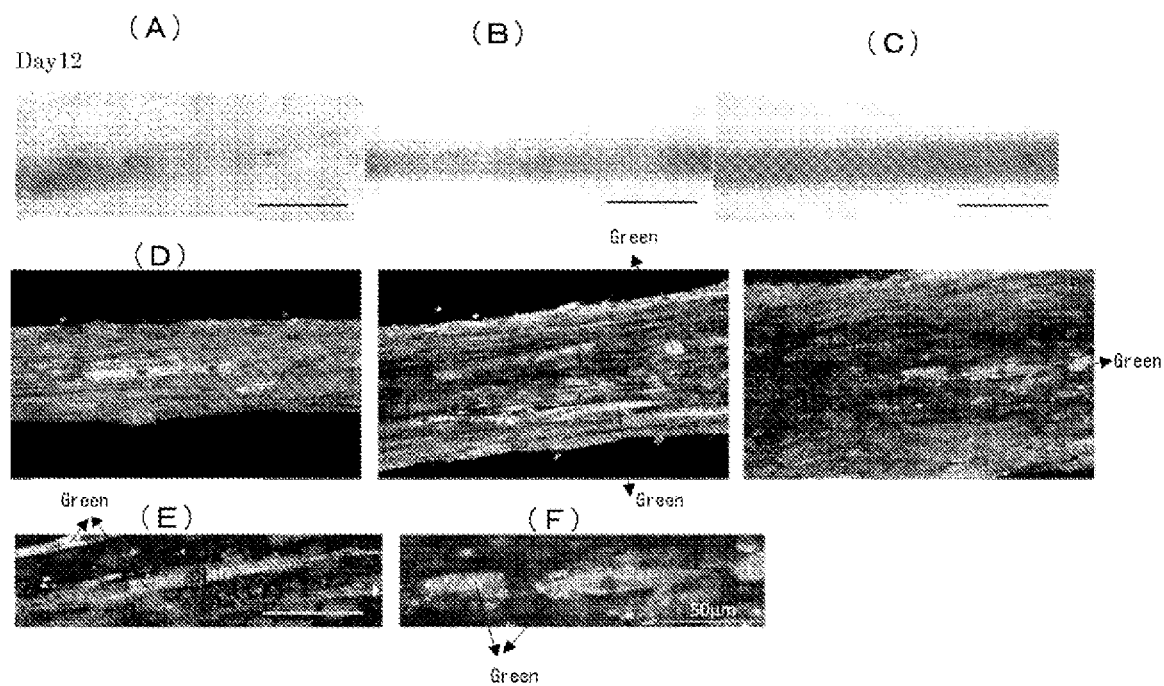
FIG. 7 show the results of an investigation of cell concentration. (A) $2.5 \times 10^7$ cells/mL, (B) $5.0 \times 10^7$ cells/mL, (C) $10.0 \times 10^7$ cells/mL, (D) immunostaining (blue: cell nuclei, green: SAA), (E) $5.0 \times 10^7$ cells/mL (enlarged), (F) $10.0 \times 10^7$ cells/mL (enlarged)

The technique is schematically illustrated in FIG. 5. The results of the investigation of hydrogel composition are shown in FIG. 6, and the results of the investigation of cell concentration are shown in FIGS. 7.

[Discussion]

(1) Hydrogel Composition

The orientation of cells can be recognized in the collagen-containing composition. Meanwhile, Matrigel tends to cause a bias in distribution of cells, and is poor at maintaining tissue shape. No remarkable difference was found in degree of maturation of the tissue among the three conditions.

(2) Investigation of Cell Concentration

A sarcomere-like structure was recognized under the condition of $5.0 \times 10^7$ cells/mL collagen gel or more. The number of myotubes famed was maximum at $5.0 \times 10^7$ cells/mL collagen gel.

3. Formation of Three-dimensional Large Muscle Tissue using Myoblast Modules

In order to fabricate a larger tissue, myoblasts were embedded in three-dimensional modules, and the modules were stacked. When the tissue width of a muscle tissue is increased, the direction of migration of cells is randomized, and hence orientation is not maintained. In view of this, in order to maintain the orientation of the tissue, a PDMS stamp was used to prepare an approximately rectangular first cell module having a plurality of approximately rectangular holes parallel to each other, and a second cell module having holes at positions different from those of the first cell module.

The two kinds of cell modules different in positions of holes are designed so that, when the cell modules are alternately stacked, narrow tissues fill each other's voids to construct a single mass of muscle tissue.

Myoblasts and a collagen type 1 gel were mixed at a concentration of $5.0 \times 10^7$ cells/mL collagen to provide a myoblast-containing collagen gel. The myoblast-containing collagen gel was seeded on a rubber module (13), and a mold stamp fabricated with PDMS was placed thereon to prepare a myocyte module (15). (About 170 µL collagen gel per module) In order to solidify the collagen gel, incubation was performed in a $CO_2$ incubator at 37° C. for 10 minutes. After that, 10% FBS F12/DMEM was added, followed by culture at 37° C. and 5% $CO_2$ for 24 hours. After 24 hours, the stamp was removed, and the myocyte modules were stacked in such a manner that the anchor immobilization portions of the myocyte modules were laid on the anchors of a culture vessel (16). The culture vessel was fabricated with a 3D printer, and was subjected to cell adhesion treatment by $O_2$ plasma treatment before use in order to enhance cell adherence. The day after the stacking of the myoblast modules, the culture medium was exchanged with 2% HS F12/DMEM, and from that day onward, culture was performed for 12 days while the medium was exchanged every other day.

Figure 8:
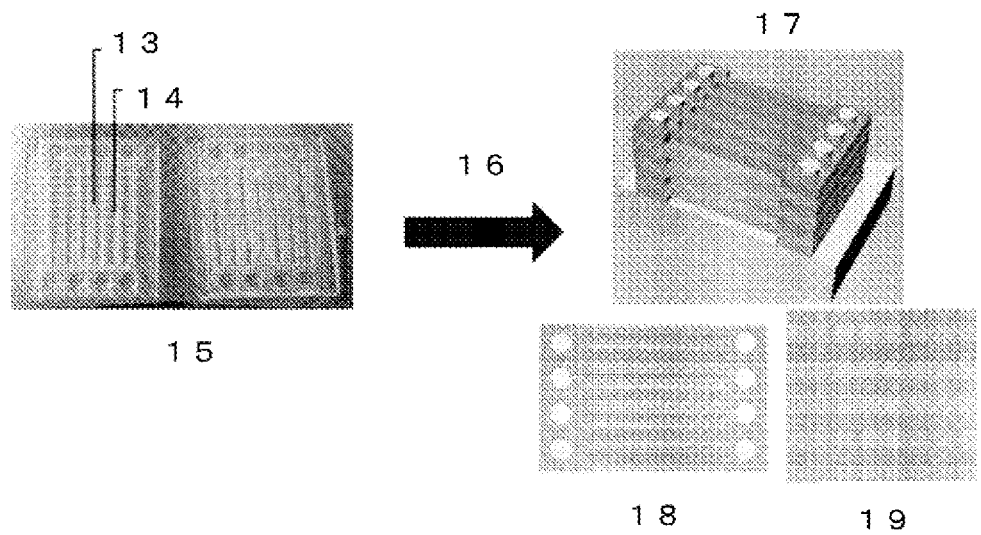
FIG. 8 is an illustration of a technique for forming a three-dimensional large muscle tissue.

The technique is schematically illustrated in FIG. 8.

Figure 9:
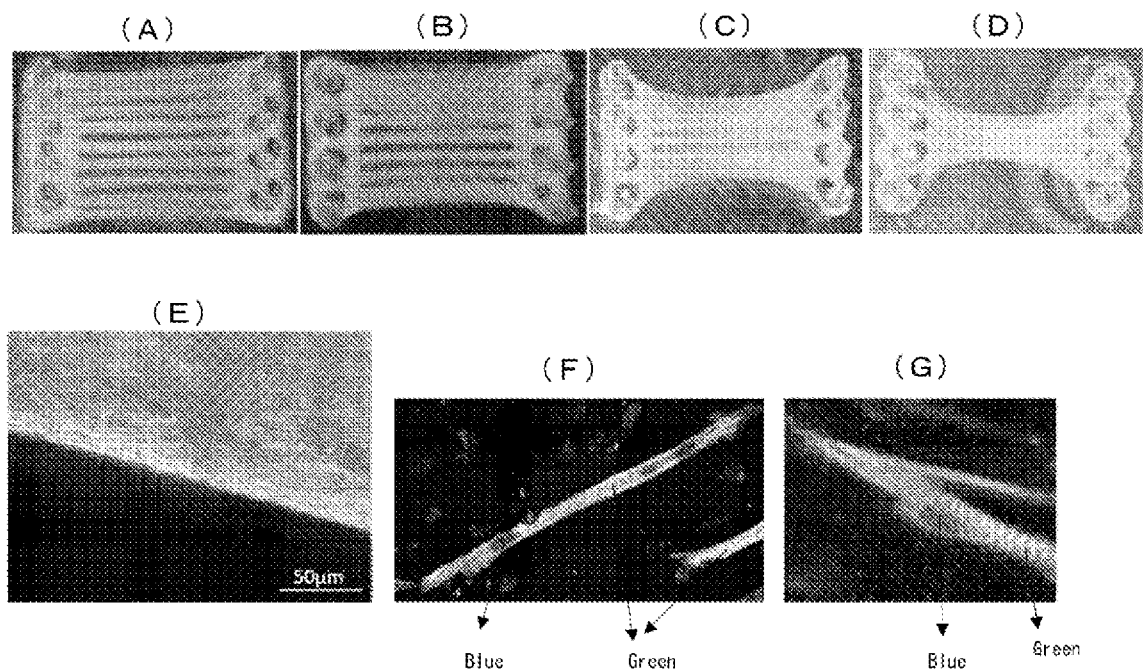
FIG. 9 show the results of 3-layer stacking of bovine myoblasts. (A) Day 0 (stacking), (B) day 1 (DM transition), (C) day 6, (D) day 12, (E) immunostaining (green; SAA, blue: cell nuclei), (F) myotube formation, (G) a sarcomere-like structure
Figure 10:
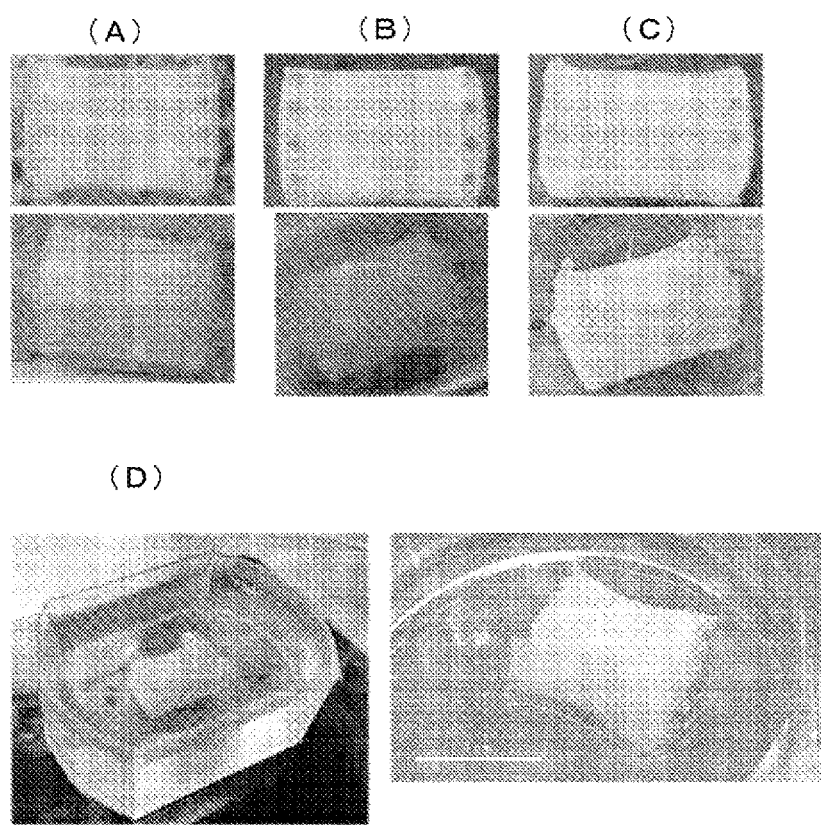
FIGS. 10 show the results of 25-layer stacking of mouse myoblasts. (A) day 0, (B) day 9, (C) day 10, (D) a culture vessel and an image during culture. After 12 days of culture. A single mass of tissue is famed. (approximately 1 cm×1 cm×6 mm thick)

The results of 3-layer stacking of bovine myoblasts are shown in FIGS. 9. In addition, the results of 25-layer stacking of mouse myoblasts are shown in FIGS. 10.

[Discussion]

It was revealed that a single mass of oriented tissue was able to be fabricated by stacking myoblast modules. At least orientation on the outside and myotube formation in some parts of the tissue were recognized from the staining of SAA.

REFERENCE SIGNS LIST 1 first cell module
2 second cell module
3 mold stamp
4 substrate
5 hydrogel solution containing skeletal myoblasts
6 sandwich
7 bird's eye view
8 sectional view taken along line A-A'
9 anchor
10 anchor-immobilizing member
11 width-adjusting stamp
12 muscle tissue
13 cell-containing collagen gel (1 mm width)
14 void (0.5 mm width)
15 myocyte module
16 alternately stack modules
17 design
18 view from above
19 sectional view

The invention claimed is:

1. A production method for a three-dimensional muscle tissue comprising the steps of:
preparing an rectangular first cell module containing skeletal myoblasts in a hydrogel, and having a plurality of rectangular holes parallel to each other, and an rectangular second cell module containing skeletal myoblasts in a hydrogel, and having a plurality of rectangular holes parallel to each other, at least part of the holes of the second cell module being at positions different from those of the holes of the first cell module in a vertical direction;
alternately stacking the prepared first cell module and the prepared second cell module to obtain a stack; and
inducing the skeletal myoblasts to differentiate into myotubes;
wherein the stacking is performed in such a manner that the holes of the first cell module do not overlap at least part of the holes of the second cell module immediately above and immediately below
wherein the holes of the first cell module and the second cell module each have a width of from 200 μm to 2,000 μm in a short-side direction.

2. The production method according to claim 1, wherein the hydrogels each contain collagen at 0.3 mg/mL or more.

3. The production method according to claim 1, wherein the hydrogels each contain ascorbic acid or a salt thereof at from 10 μM to 1,000 μM.

4. The production method according to claim 1, wherein a distance between adjacent holes of each of the first cell module and the second cell module is from 200 μm to 2,000 μm in a short-side direction.

5. The production method according to claim 1, wherein the first cell module and the second cell module each have a size measuring 3 mm or more in a short-side direction and 9 mm or more in a long-side direction.

6. The production method according to claim 1, wherein a total number of the first cell modules and the second cell modules to be stacked is 6 or more.

7. The production method according to claim 1, wherein, in the stack, both ends of each of the first cell module and the second cell module in a long-side direction are immobilized.

8. The production method according to claim 1, wherein the production method is a production method for an edible three-dimensional muscle tissue.

9. The production method according to claim 1, wherein the skeletal myoblasts are bovine skeletal myoblasts.

10. A three-dimensional muscle tissue, which is obtained by the production method of claim 1, wherein the three-dimensional muscle tissue comprises a stack comprising a rectangular first cell module containing myotubes in a hydrogel, and having a plurality of rectangular holes parallel to each other, and a rectangular second cell module containing myotubes in a hydrogel, and having a plurality of rectangular holes parallel to each other, at least part of the holes of the second cell module being at positions different from those of the holes of the first cell module in a vertical direction, wherein the holes of the first cell module do not overlap at least part of the holes of the second cell module immediately above and immediately below, and wherein the holes of the first cell module and the second cell module each have a width of from 200 μm to 2,000 μm in a short-side direction.

* * * * *